(12) United States Patent
Christensen et al.

(10) Patent No.: US 7,054,836 B2
(45) Date of Patent: May 30, 2006

(54) METHOD FOR ASSISTING A CUSTOMER IN BUILDING A BUILD-TO-ORDER MEDICAL DEVICE

(75) Inventors: Thomas Kragh Christensen, Allerod (DK); Carl Kristen Buhl, Horsholm (DK)

(73) Assignee: Novo Nordisk A/S, Bagsvaerd (DK)

( * ) Notice: Subject to any disclaimer, the term of this patent is extended or adjusted under 35 U.S.C. 154(b) by 883 days.

(21) Appl. No.: 09/996,348

(22) Filed: Nov. 28, 2001

(65) Prior Publication Data

US 2002/0156694 A1 Oct. 24, 2002

Related U.S. Application Data

(60) Provisional application No. 60/255,037, filed on Dec. 12, 2000.

(30) Foreign Application Priority Data

Nov. 30, 2000 (DK) ................................ 2000 01804

(51) Int. Cl.
*G06F 17/60* (2006.01)
(52) U.S. Cl. .......................................... 705/26; 705/28
(58) Field of Classification Search .................. 705/26, 705/27, 28, 29
See application file for complete search history.

(56) References Cited

U.S. PATENT DOCUMENTS

| 5,930,768 | A | 7/1999 | Hooban | 705/27 |
| 5,940,807 | A | 8/1999 | Purcell | 705/26 |
| 5,986,670 | A | 11/1999 | Dries et al. | 345/435 |
| 6,813,610 | B1 * | 11/2004 | Bienias | 705/27 |
| 2002/0073001 | A1 * | 6/2002 | Palmer et al. | 705/29 |
| 2002/0107763 | A1 * | 8/2002 | Palmer et al. | 705/29 |

FOREIGN PATENT DOCUMENTS

| EP | 0 467 257 A2 | 1/1992 |
| GB | 2 335 768 A | 9/1999 |
| WO | WO 00/13109 | 3/2000 |
| WO | WO 00/26808 | 5/2000 |
| WO | WO 00/49544 | 8/2000 |
| WO | WO 00/60513 | 10/2000 |

OTHER PUBLICATIONS

Yan, Yi et al.: "Interactive, Agent Based, Modeling and Simulation of Virtual Manufacturing Assemblies"; Apr. 1998; Proceedings of the 36th Annual Southeast Regional Conference.*

* cited by examiner

*Primary Examiner*—Jeffrey A. Smith
(74) *Attorney, Agent, or Firm*—Marc A. Began; Reza Green; Len S. Smith

(57) ABSTRACT

A method and system for configuring a product assembled from a plurality of components, where each component may be available in several variants; the method comprises the steps of presenting to a user, via a user interface, a first plurality of available variants of a first one of said plurality of components; receiving from a user an indication of a first variant selected from the first plurality of variants; receiving inventory data from an inventory management system, the inventory data indicating an available subset of the first plurality of available variants as being in stock; indicating to the user, via the user interface, the first subset of the first plurality of available variants as being selectable.

10 Claims, 11 Drawing Sheets

METHOD FOR ASSISTING A CUSTOMER IN BUILDING A BUILD-TO-ORDER MEDICAL DEVICE

This application claims the benefit of Provisional Application No. 60/255,037, filed Dec. 12, 2000.

This invention relates to a method of configuring a product, and more specifically a method for customisation a product assembled from a number of components, especially in a build-to-order system.

Build-to-order systems are known in the art and are used in order to limit the number of assembled products which have to be kept in stock. In a build-to-order assembly system, only the pre-fabricated components are kept in stock in a number of possible variants, such as components in different colours, sizes, components with different features or other options. When an order for a customized combination of the components is received, the product is assembled, tested and shipped. Often this process is considerably more efficient and economical than keeping assembled products based on the possibly vast number of combinations of components in stock.

A build-to-order system for specifying, ordering, and building a computer system is known from GB 2335768. In this prior art system, the user is presented with a list of options, such as computer software components to be installed on a computer system, where each option is compatible with any previously selected options, such as operating system or hardware components.

It is also known in the art to present to a user of a purchasing system operating via a computer network a picture of an item to be purchased. If the item exists with different options, such as different colours, the user may be presented with a picture of the item in the selected colour.

U.S. Pat. No. 5,930,768 teaches a system for remote user controlled customisation of multimedia data products, such as songs selected from a repository of songs and recorded in a desired playing order on for example a compact disc. Hence, the above prior art system is only concerned with electronic data files, which may be copied at low cost and in substantially unlimited numbers.

The above prior art methods and systems do not account for situations where the pre-fabrication of a batch of a given variant of a component is time-consuming or expensive. This may be the case when the production of the components of the product is subject to extensive approval requirements, as for example for the production of medical devices which are subject to approval by the relevant authorities. The time-consuming and expensive batch production of components may yield unsatisfactorily long delivery times for a customized product, if a selected variant is out of stock, or it may yield an inefficient production process, where small batch sizes are produced in response to individual orders of customised products.

Therefore it is an object of the invention to reduce the delivery times of customized products.

It is a further object of the invention to optimise the production process of a customised product.

It is yet another object of the invention to avoid backorders for individual customised products.

According to a first aspect of the invention these and other objects are achieved when a method of configuring a product, where the product is to be assembled from a plurality of components, each component being available in at least one variant, the method comprising the steps of presenting to a user, via a user interface, a first plurality of variants of a first one of said plurality of components; receiving from a user an indication of a first variant selected from the first plurality of variants; is characterised in that the method further comprises the steps of receiving inventory data from an inventory management system, the inventory data indicating an available subset of the first plurality of available variants as being in stock; indicating to the user, via the user interface, the first subset of the first plurality of available variants as being selectable.

It is an advantage of the invention that the possibility of selecting variants is limited to the variants which are actually in stock, as reported by the inventory management system. Therefore, a situation is avoided where the production and the delivery of a customised product are delayed due to one or more components not being available in the selected variant.

Furthermore, a situation is avoided where the production of a new batch of a variant is initiated due to one or a few orders for customised products including that variant.

In a preferred embodiment of the invention the step of presenting the first plurality of variants further comprises the step of limiting the first plurality of variants presented to the user to the first subset of available variants.

In a preferred embodiment of the invention, the method further comprises the step of transmitting an information signal to the inventory management system, the information signal representing an identification of the selected variants.

It is an advantage of the invention that the components required for the customised product may be reserved in an inventory management system and, therefore, the inventory data may be kept up-to-date based upon the currently ordered components.

In another preferred embodiment of the invention the method further comprises the steps of presenting to the user, via the user interface, a second plurality of variants of a second one of said plurality of components; receiving from the user an indication of a second variant selected from the second plurality of variants; presenting to the user via the user interface a graphical representation of the first selected variant of the first component in a predetermined relationship to the second selected variant of the second component.

Consequently, it is an advantage of the invention that it provides an efficient user interface for the selection of customised components which are to be assembled to a product.

It is a further advantage of the invention that it provides a graphical representation, such as a picture, a drawing, or preferably a three-dimensional rendering of the customised product, thereby providing the possibility Of viewing the particular customisation prior to purchasing or producing it.

As selected individual components are presented in the predetermined relationship to selected other components, preferably their relative position as in the assembled product, a visual impression of the ease of use of the customised product is provided, especially since the processes of assembling and disassembling the product may be simulated.

In a preferred embodiment of the invention the method further comprises the step of graphically animating the assembling of the second variant of the second component with the first variant of the first component.

In another preferred embodiment of the invention the method further comprises the step of animating the displayed representation of the first variant of the first component in the predetermined relationship to the second variant of the second component in response to user commands.

A graphical animation of the assembly process or the functions of the product or parts of the product provides a realistic simulation of the use of the product and, therefore, it provides a realistic impression of the usability of the product.

In a further preferred embodiment of the invention the method further comprises the step of interactively animating the assembling of the second variant of the second component with the first variant of the first component, where the interactively animated assembly is controlled by user commands.

It is an advantage of the invention that it may serve as a means of training the user in the use of the product, as the user may practise the steps of assembling or disassembling the product.

In another preferred embodiment of the invention the method further comprises the step of transmitting order information to a production management system, the order information including configuration data identifying the first variant of the first component and the second variant of the second component. It is an advantage of the invention that the production and assembly process may be automatically initiated.

According to a second aspect of the invention the above and other objects are achieved when a system for customising a product, where the product is assembled from a plurality of components, each component being available in at least one variant, the system comprising first display means adapted to present a first plurality of variants of a first one of said plurality of components; first input means adapted to receive an indication of a first variant selected from the first plurality of variants; is characterised in that the system further comprises second display means adapted to indicate a first subset of the first plurality of variants as selectable, where the first subset of variants is identified by a set of inventory data received from an inventory management system.

As the system and embodiments thereof correspond to and have the corresponding advantages as the method for customising a product and embodiments thereof, they are not described again.

Furthermore, the invention relates to the use of the method described above and below for customising a medical application device, such as an injection pen.

Further, the invention relates to a computer program comprising program code means for performing the method described above and below when said program is run on a computer.

Further, the invention relates to a computer program product comprising program code means stored on a computer-readable medium for performing the method described above and in the following when said computer program product is run on a computer. A computer-readable medium may e.g. be a CD-ROM, a CD-R, a DVD RAM/ROM, a floppy disk, a hard disk, a smart card, a network accessible via a network connection, a ROM, RAM, and/or Flash memory, etc. or generally any other kind of media that provides a computer system with information regarding how instructions/commands should be executed.

Hereby, when a computer is caused to retrieve electronic information—as a consequence of the contents of a computer-readable medium as described above—the advantages mentioned in connection with the corresponding method according to the invention are achieved.

Finally, the invention relates to a computer data signal embodied in a carrier wave, comprising program code means for performing the method described above and below when said program is run on a computer.

The invention will be explained more fully below in connection with preferred embodiments and with reference to the drawings, in which.

Figure 8A:
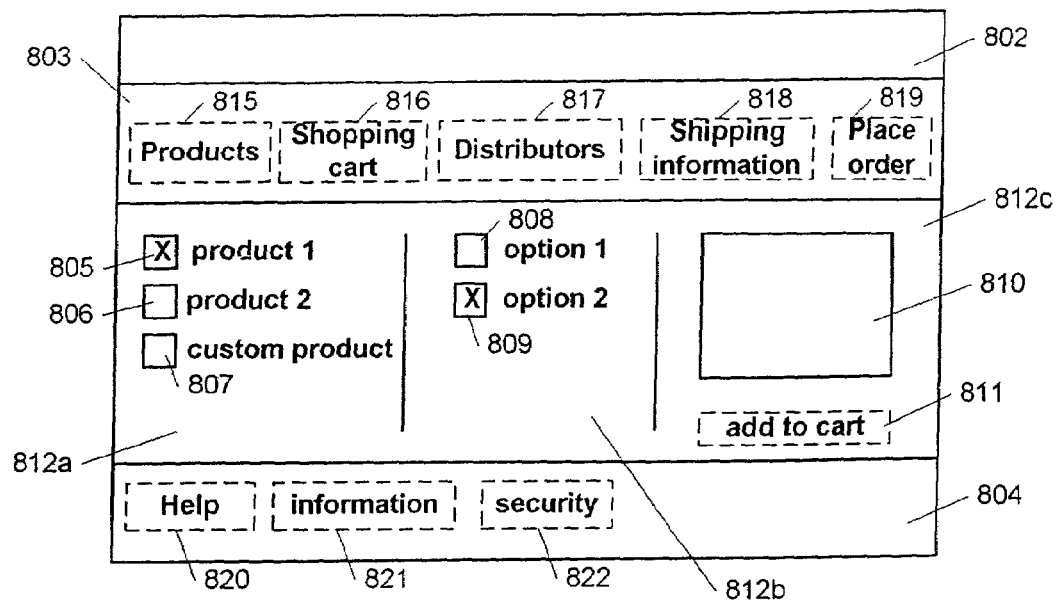
Figure 8B:
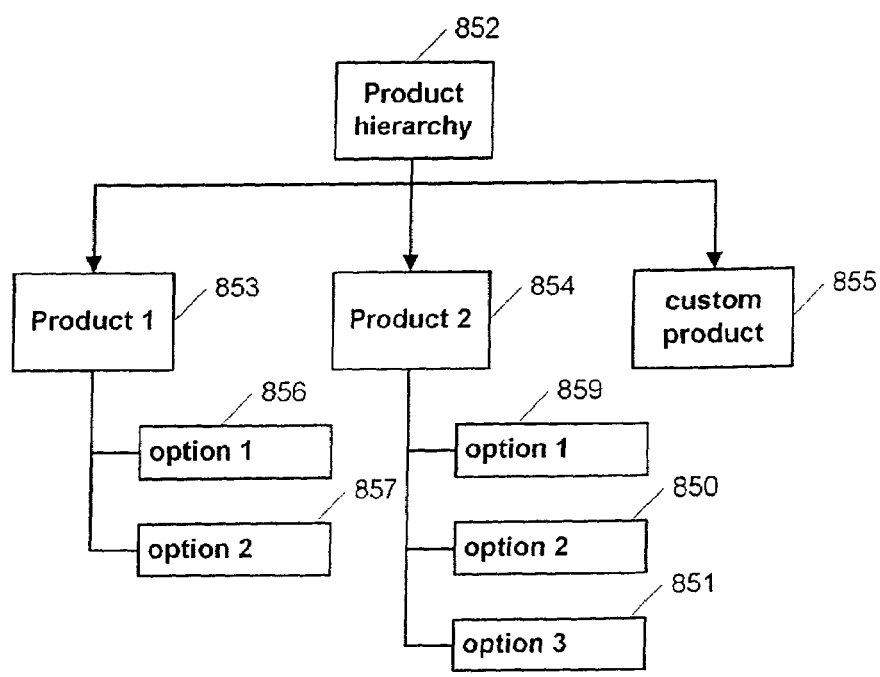

FIG. 7a–g show examples of a user interface for the selection of customised components;

FIG. 8a shows an example of a user interface of a general purchase module according to an embodiment of the invention; and FIG. 8b shows an example of a product hierarchy comprising both standard products and custom products according to the invention.

The invention will be explained with reference to a specific example comprising the customisation of an injection pen for the application of medication such as insulin. However, the restriction to a specific example is not a limitation of the invention, which may be applied to any product comprising a plurality of customisable components. Other examples include a medical kit comprising a plurality of components in a common container, or a plurality of products assembled in a shopping cart.

Furthermore, the invention will be described in the context of the Internet as a communications network running a TCP/IP protocol. However, this is not a limitation of the invention as other communications networks and protocols may be used for the communication with the users, such as television networks, telecommunications networks, WAP implemented on a wireless communications network, or the like.

Figure 1:
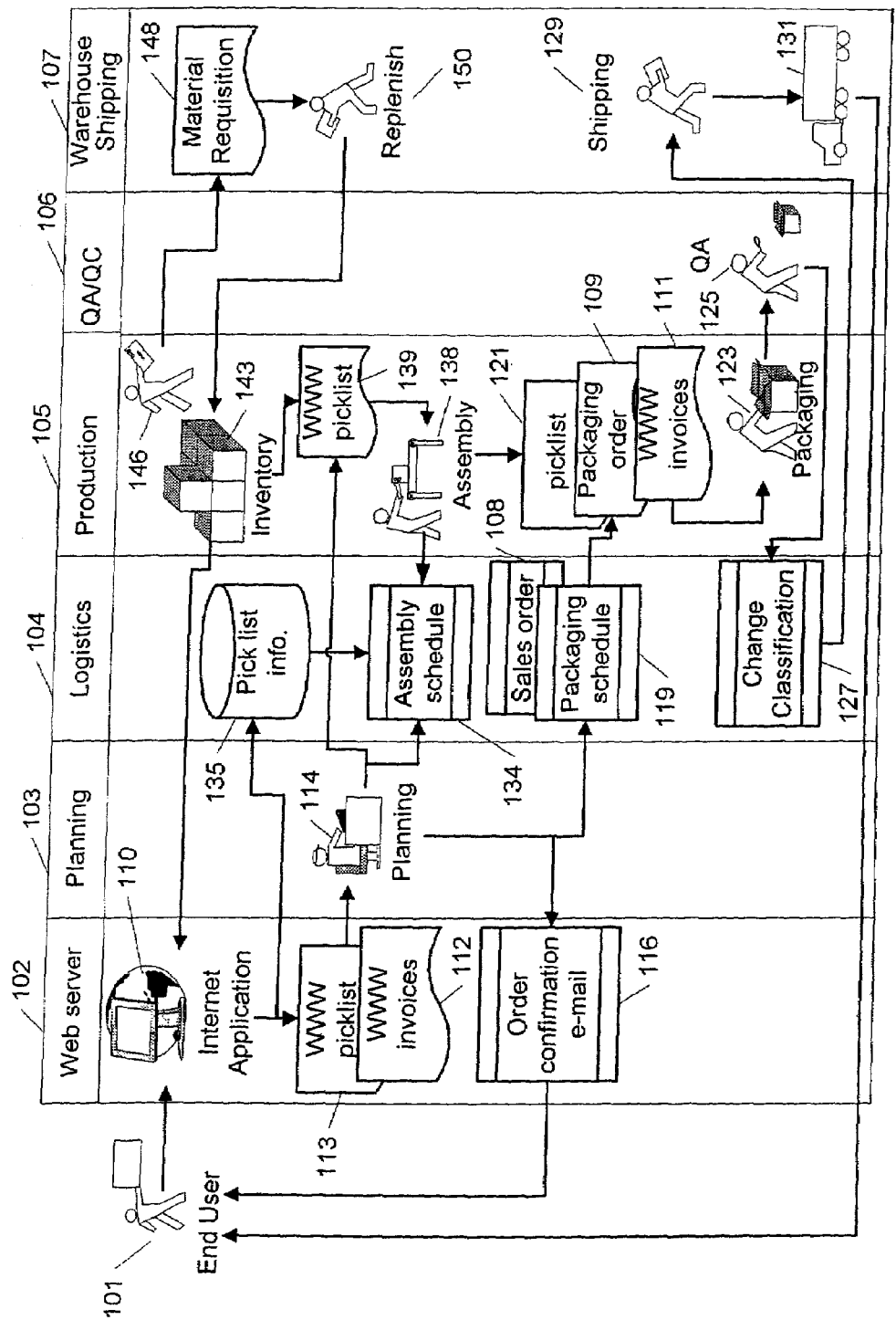
FIG. 1 shows a view of the overall work flow in an embodiment of a build-to-order production system used in connection with an embodiment of the invention.

FIG. 1 shows a schematic view of an embodiment of a build-to-order production process which may be used in connection with an embodiment of the invention. The process is illustrated by the data flow between different components involved in the process. The components are illustrated as columns 102–107 in FIG. 1, where the columns 102–107 contain related software entities, such as data objects, and functional components performing or supporting individual steps of the production process. The process is initiated by a user 101 who places a purchase order, preferably via a browser with access to the Internet and with any suitable plug-in known in the art supporting graphical applications and preferably 3D-object renderings and animations, such as the Cult3D® product. Upon placement of the order by the user 101, order information is transmitted via the Internet to an Internet application 110 which runs on a web server and creates an internal representation of the order information, preferably comprising a pick list object 113 including identifications and quantities of the selected components and an invoice object 112 comprising information such as address, payment method, shipment information, or the like. The Internet application 110 transmits the order information 112–113 via a communications network, preferably a Local area network, to a planning module 103 and a logistics module 104, which are further connected, preferably via the communications network, with a production module 105, a module 106 supporting quality assurance (QA) and quality control (QC), and a warehouse/shipping module 107. The planning module 103 comprises a user interface, such that an authorised user, via a planning session 114, may view the order information 112, confirm the order, preferably electronically, for example via electronic mail 116, and plan the further production process. Alternatively, this process or parts of this process may be executed automatically by the planning module 103. According to this embodiment, the production process is controlled by an electronic sales order object 108 which initiates and represents the production of the corresponding customised product. The sales order object 108 is related to an assembly schedule 134 and a packaging schedule 119. These and other objects are managed in a database controlled by the logistics module 104. The assembly schedule 134 schedules the assembly 138 of the ordered product based on reported quantities retrieved from a pick list information database 135, where the components have been reserved via the pick list object 113 included in the order information received from the Internet application 110. During the planning session 114 and based on the pick list 113 included in the order information, a pick list 139 is generated which identifies the physical components to be used in the assembly 138 of the product. This may be done by identifying the components via a part number and a batch number. A possible hierarchic number scheme for the injection pen described in connection with FIG. 2, where the number scheme allows the identification of the product, the components and the actual variants of the components, is listed in Table 1.

TABLE 1

Example of a part number structure for a customised injection pen.

| product ID | component ID | variant ID | name |
|---|---|---|---|
| 27244 | Z | 1 | cap variant 1 |
| 27244 | Z | 2 | cap variant 2 |
| 27244 | Z | 3 | cap variant 3 |
| 27244 | Y | 1 | pen fill holder variant 1 |
| 27244 | Y | 2 | pen fill holder variant 2 |
| ... | ... | ... | ... |

The pick list 139 is transferred to the production module 105, where it may be viewed during assembly 138. The pick list 139 may also be used to retrieve the relevant components and to update the inventory status in an inventory database 143. During assembly 138, the assembly schedule 134 may be updated, via a user interface of the production module 105, based upon the actual progress of the assembly 138. After completion of the assembly 138, a packaging order object 109 is generated which in turn triggers the actual packaging 123 of the assembled product. The packaging 123 is based on the packaging schedule 119 created during the planning session 114 and a pick list 121 including the assembled product, relevant packaging material, instructions in the correct language, and the like. The production module 105 may also generate a printed version 111 of the invoice to be included with the shipped package. After completion of the packaging 123, the packed product is inspected according to a QA procedure 125 and, upon approval, a change of classification 127 of the packed product to "ready for shipping" is registered in the logistics system 104 via a user interface.

The control of the inspected product may now be transferred to a shipping module 107 which manages the actual shipping 129 of the packed product, and which may even allow the tracking of the shipment 131 to the user 101. The status of the actual inventory may be supervised continuously or periodically via the inventory database 143. If a given component is out-of-stock, a material requisition object 148 may be generated automatically or manually via a user interface 146. The material requisition object 148 controls the replenishment 150 of the inventory with the corresponding components and a corresponding update of the inventory database 143. The current status of the inventory may also be sent to the Internet application 110, for example by periodically transferring the information from the inventory database 143 to the Internet application 110, or by the Internet application 110 querying the inventory database 143.

It is an advantage of this build-to-order method that it may be integrated in a regular production process running batch production of non-customised products in parallel with the customised production. This may be an important advantage, if the production control tools are subject to approval rules, as is the case in for example the medical industry. Furthermore, the utilisation of the inventory information in the Internet application 110 allows the product information to be adapted to the currently available components, thereby avoiding backorders and the need to manage possible payments for undeliverable products.

Figure 2:
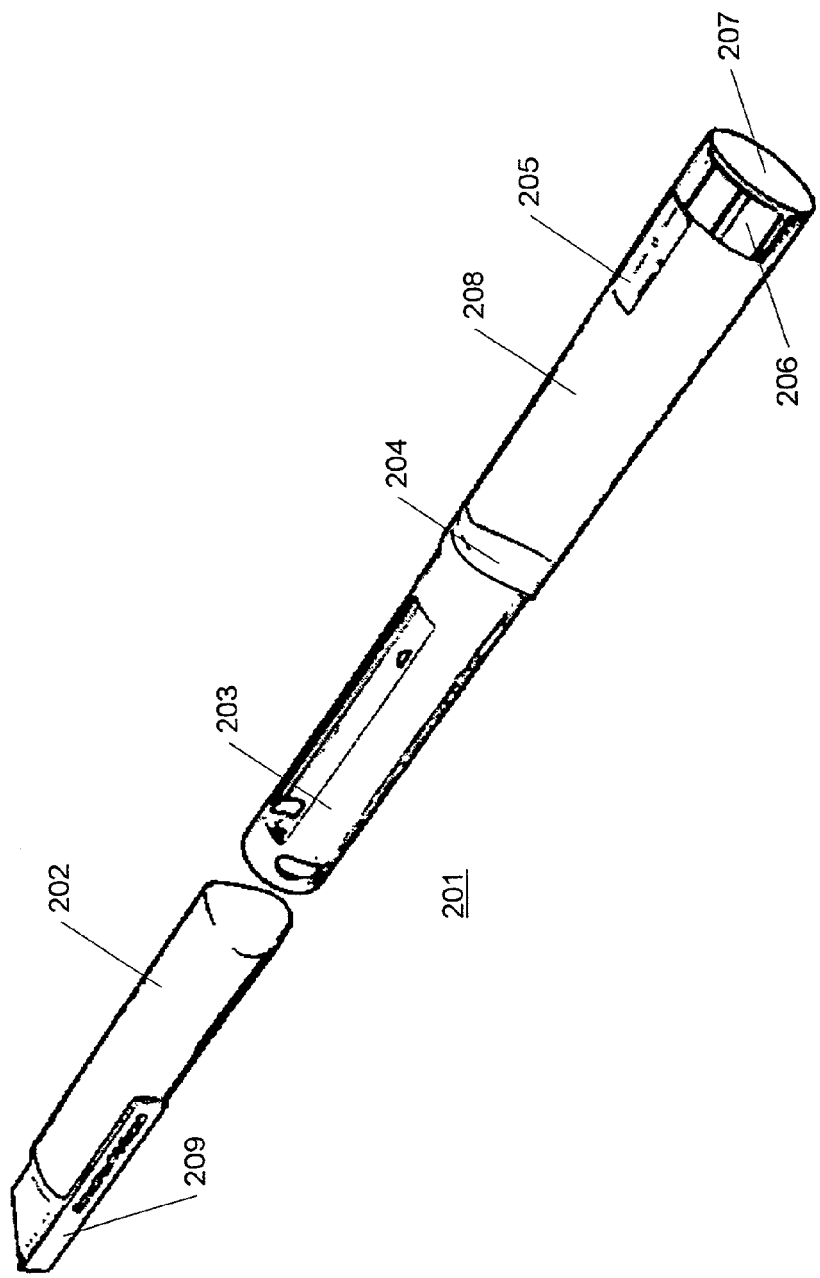
FIG. 2 shows a schematic view of an injection pen assembled from a number of components available in a plurality of variants.

FIG. 2 shows an example of a product which comprises a plurality of components and which may be configured according to the invention. FIG. 2 shows a medical injection pen 201 used to inject medicine, such as insulin. The injection pen 201 comprises 8 different components 202-209, each component may be customised, for example by choosing a colour from a set of available colours. The injection pen 201 comprises a holster 208, which in turn comprises a dose indicator 205, a dose dialler 206 for selecting the desired amount of medicine to be injected during the following application, and a button 207 for releasing the medicine. The holster 208 is connected to a pen fill holder 203 via a middle piece 204. The pen fill holder is adapted to hold a matching container (not shown) with medicine in a predetermined position relative to the holster 208. The injection pen further comprises a cap 202 for protecting the container, and the cap further comprises a clip 209. In Table 2, the 8 components 202–209 are listed and for each component a number of available colours is exemplified.

TABLE 2

Possible variants of the components of the injection pen 201.

| component | variants |
|---|---|
| clip 209 | 3 colours (grey, yellow, green) |
| pen fill holder 203 | 4 colours (grey, yellow, blue, orange) |
| middle piece 204 | 4 colours (grey, yellow, blue, orange) |
| dose dialler 206 | 3 colours (grey, yellow, orange) |
| button 207 | 3 colours (grey, green, blue) |
| cap 202 | 4 colours (steel, red, blue, green) |
| holster 208 | 4 colours (steel, red, blue, green) |
| dose indicator 205 | 3 colours (grey, yellow, green) |

Even though the number of variants of each component listed in table 2 is small, they result in a total number of 20,736 possible combinations, illustrating the advantage of a build-to-order system as compared to keeping all 20,736 assembled variants in stock. Furthermore, the customisation possibilities may comprise further options, such as a choice of different cases for storing the pen, personalised engravings, different types of display, such as analogue or digital, extra features, such as a watch, an indicator of the contents of the pen, a timer, or the like. Each further option multiplies the total number of possible end products.

Figure 3:
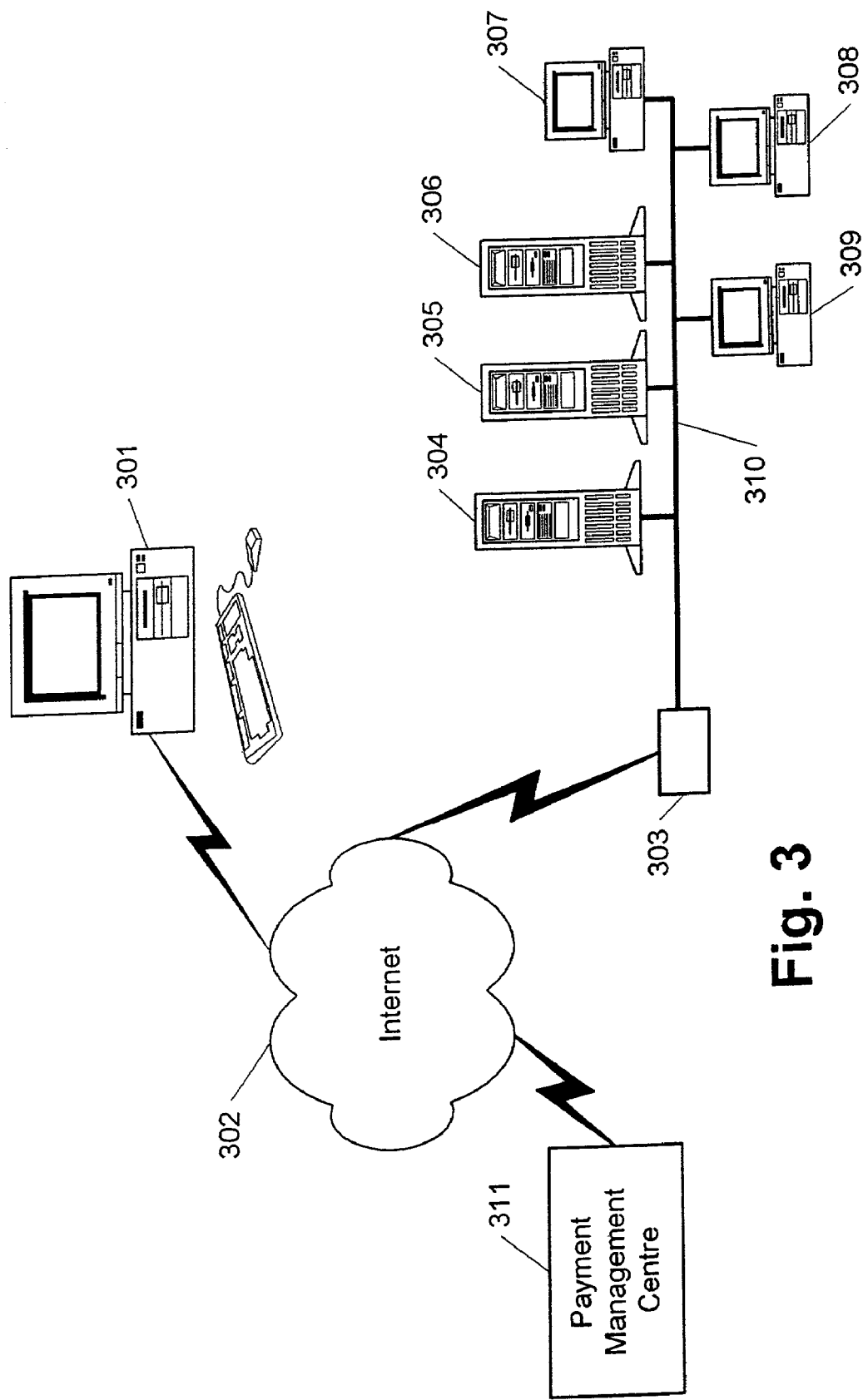
FIG. 3 shows a schematic view of a system according to an embodiment of the invention.

Now referring to FIG. 3, a system according to an embodiment of the invention comprises a computer 301, preferably a standard PC with one or more CPUs, a computer screen, a keyboard, a pointing device such as a mouse, track ball, touch pad, touch screen, or the like, and with access to the Internet, for example via a modem or via a local network connected to the Internet 302. Alternatively, the computer 301 may be a portable computer, such as a laptop, a handheld computer, a telecommunications device with a graphical screen, a personal digital assistant (PDA), or the like. The system further comprises server computers 304–306 for executing the application programs: An application server 304, a server for the logistics system 305, and a database server 306, as described in connection with FIG. 4. The server computers may be standard server computers with one or more CPUs and which are connected as a computer network 310, preferably by a local area network (LAN). Alternatively, the system may comprise a different number of server computers, for example only one server computer for all applications. The computer network is connected to the Internet via an TCP/IP router 303 which is preferably combined with a firewall.

The system also comprises workstations 307–309, connected to the server computers 304–306 via the computer network which, during the planning, production, assembly, packing, and shipping, may be used to access the applications running on the application servers 304–306. The system is connected, via the Internet or via a special secure communications network, to a payment management centre 311, which handles the actual credit card transactions during the order process.

Figure 4:
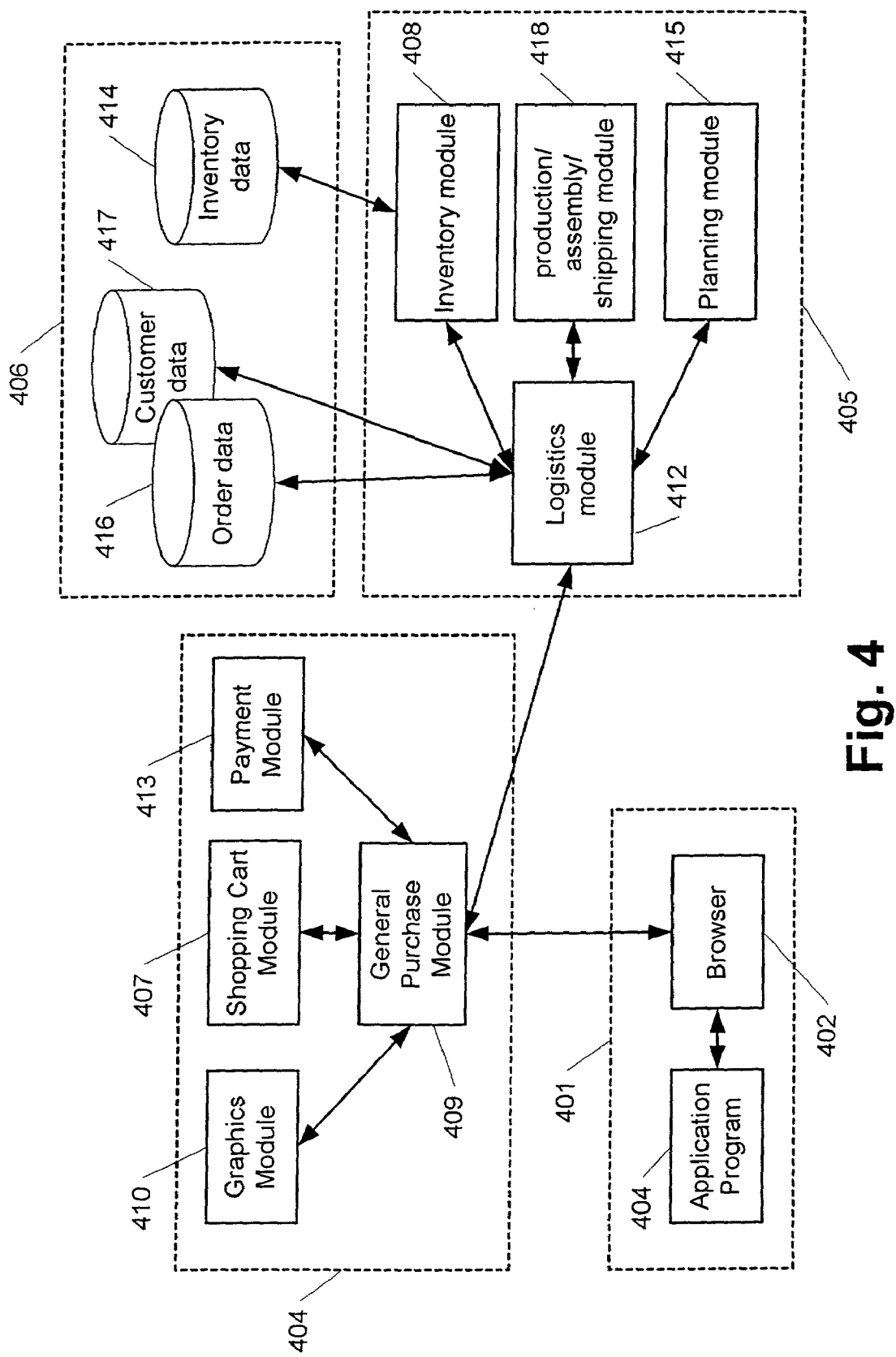
FIG. 4 shows a schematic view of the software processes according to an embodiment of the invention.

Now referring to FIG. 4, the software components of the system according to an embodiment of the invention comprise a browser 402 running on the customer's computer 401 for accessing, via the Internet, the Internet application of the general purchase module 409 located on the application server 404. The general purchase module 409 utilises a graphics module 410 for generating an application program 404 which, when downloaded to and run on the computer 401, displays and allows manipulation of a graphical representation of the components of the product. The general purchase module 409 further utilises a shopping cart module 407 for managing the customers' shopping cart data, and a payment module 413 responsible for checking credit card information and capturing the payments. The general purchase module 409 communicates, preferably via a local area network, with the logistics system 412 having an inventory module 408 for managing the data in the inventory database 414, a module 418 for managing production, assembly and shipping, and a planning module 415 for use in the planning of the production, assembly, packing and shipping. The logistics module 412 further has access to databases 416–417 containing order data and customer data, respectively. The databases 416–417 are located on a database server 406 running a database management system.

The logistics module 412, the inventory module 408, the production module 418, and the planning module 415 may be different software applications or parts of a common software application which may be a commercially available standard system. Preferably, the inventory management system 408 comprises a suitable interface for extracting inventory data about a predetermined group of products or components. The interface may be a data file in a predetermined file format, generated by the inventory management system 408, or another interface allowing data extraction from the inventory management system 408, such as dynamic data exchange, a database query via e.g. SQL, an auto-generated electronic mail, or the like.

Figure 5:
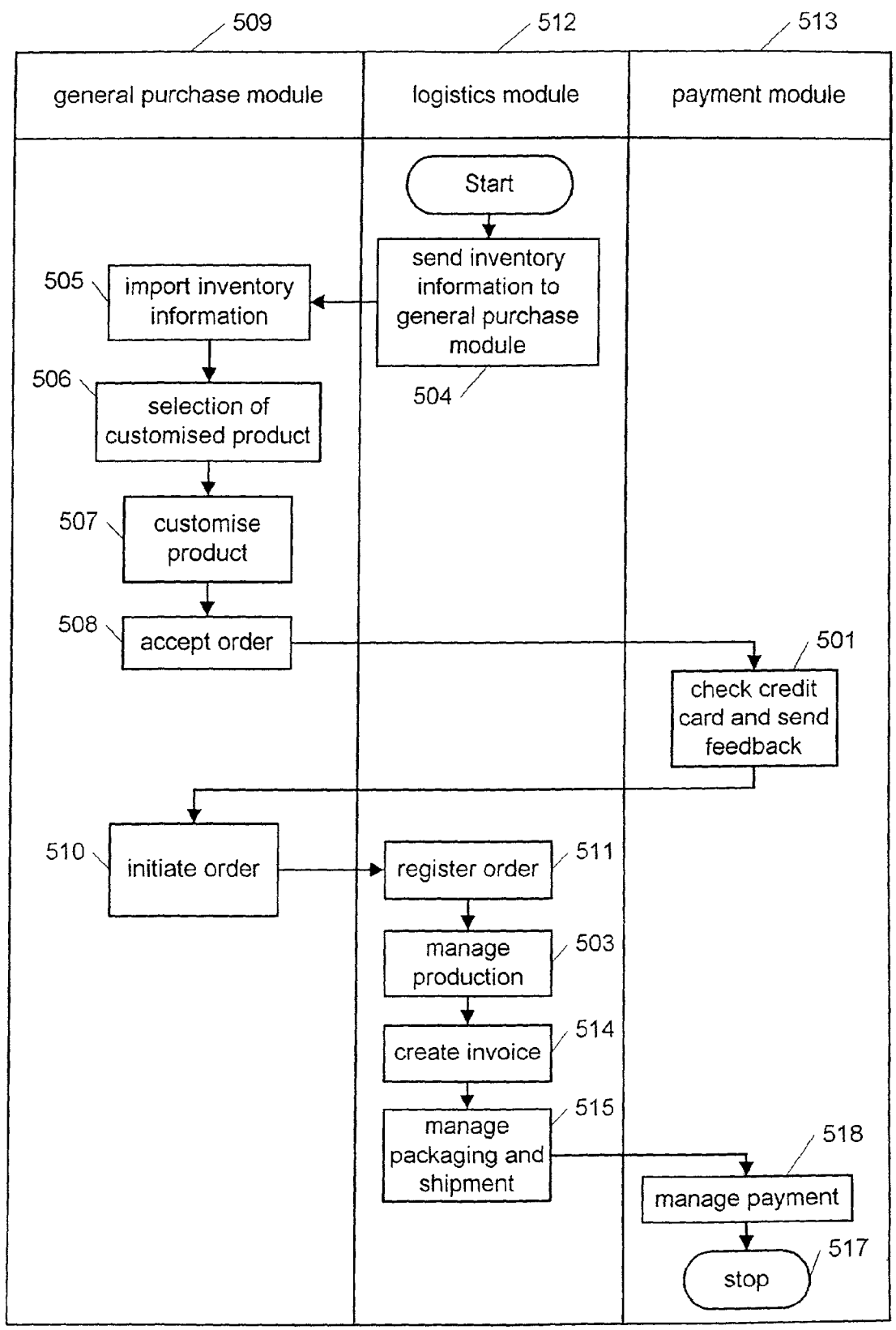
FIG. 5 shows a flow diagram of the order management process according to an embodiment of the invention.

FIG. 5 shows a flow diagram of the order management process according to an embodiment of the invention. Each of the individual process steps is performed by one of the software components described in connection with FIG. 4, as illustrated by the three columns 509,512, and 513 corresponding to the general purchase module 501, the logistics module 512, and the payment module 513, respectively.

The process is initiated by the step 504 of sending inventory information from the logistics module 512 to the general purchase module 501. The inventory information is retrieved from the inventory database 414 in FIG. 4, and comprises information about how many items of each variant of each component of the product are currently in stock, preferably also taking into account items which have been reserved by previous orders via the pick list information database 135 shown in FIG. 1, but which have not been physically used yet. In step 505, the inventory information is imported by the general purchase module 509. Alternatively, the transmission 504 and importing 505 of the inventory information may be performed at a later stage of the process, for example after the step 506 of selecting a "customised product" option, or even as a separate process unsynchronised with the actual order process. The information may also be transmitted directly from the logistics system 512 to the graphics module.

Furthermore, the sending 504 and importing 505 of inventory information may be controlled in several ways, including sending at regular time-intervals, such as daily, hourly or the like. The sending 504 may alternatively or additionally be triggered by predetermined changes in the inventory database, such as a variant becoming unavaiable or an unavailable item becoming available again. The general purchase module 509 may also send a request for transmission of at least parts of the inventory data.

The customisation process is initiated by the step 506 of a user selecting an item "custom product" via the user interface of the general purchase module 509. The "custom product" item may be one of several selectable options within a product hierarchy as is illustrated in connection with FIGS. 8a–b, or it may be reached by the user following a corresponding hyperlink. In the next step 507, the product is customised, and a specification of the selected customisation together with an order identification is attached to a shopping cart object maintained by the general purchase module 509.

An embodiment of the sub-process 507 is described in connection with FIG. 6. After placing a specification of a customised product in the user's shopping cart, the system may receive an "accept order" command from the user (step 508), for example by the user clicking with a pointing device on the "place order" button 819 of the user interface illustrated in FIG. 8a. During step 508, the relevant purchase information, such as amount due, name and address of user, credit card number and expiration date, etc., is either input by the user via the user interface, or it may be retrieved from a customer database. Order information may be displayed via the user's browser. The payment information is transmitted to the payment module 513, which in step 501 checks the validity of the credit card information and preferably reserves the amount due. The payment module 513 returns a reply to the purchasing module 509 indicating the result of the verification in step 501. In the next step 510 the general purchase module 509 sends the order information to the logistics system 512, for example via an autogenerated email or an URL.

Further order identifications, relevant parameters, invoice information, or the like may also be stored in a file on the application server or in a database for making them accessible for the logistics module 512. In response to receiving the order information from the general purchase module 509, the logistics module 512 registers the order internally (step 511) and acquires any additional information from the file or database on the application server. Subsequently, the logistics system 512 manages the production process (step 503), and the packaging and shipping (step 514), as is further illustrated in FIG. 1. Finally, the payment module 513 captures the actual payment of the product (step 518).

Figure 6:
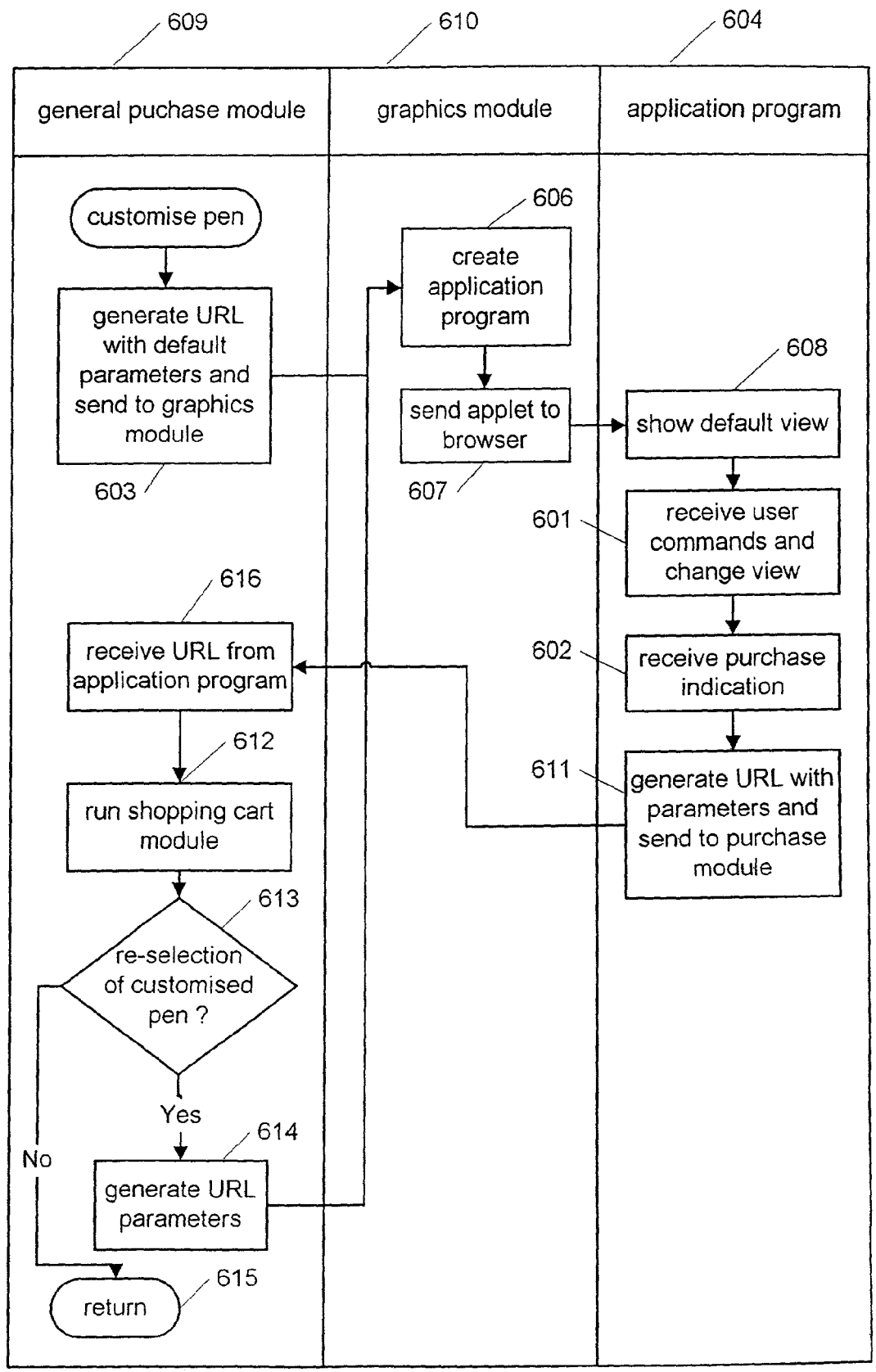
FIG. 6 shows a flow diagram of the configuration process according to an embodiment of the invention.

FIG. 6 shows a flow diagram of the sub-process of step 507 in FIG. 5, representing the configuration process according to an embodiment of the invention and with reference to the injection pen described in connection with FIG. 2. The columns 609, 610, and 604 refer to three of the software modules of FIG. 4 which implement the corresponding steps: The general purchase module 609, the graphics module 610, and the application program 604, respectively. During the initial step 603, a URL with a set of parameters is sent, preferably via the Internet, to the graphics module 604. The included parameters may identify a default configuration of the pen including a default case, and they may include an order identification and preferably inventory information generated by the logistics system. Upon receipt of the URL, the graphics module 610, in step 606, creates computer-readable code of an application program 604, such as an applet, which implements a graphical user interface for presenting the selectable variants of the components to the user and for receiving the user's selection. The graphics module 610 utilises the information generated by the inventory database and limits the presented variants to those which can currently be delivered. Alternatively, the variants which are currently unavailable may be made visible but not selectable.

The next step 607 comprises sending the application program 604 to the user's browser via the Internet. On the client computer running the browser, the transmitted application program 604 is started and as a next step 608 it displays a graphical user interface, preferably within the user's browser. Initially a default view of the product is displayed. This may for example be a default configuration of the product or an empty window with no components displayed. The application program 604 provides a user interface to the user, which displays the assembled product, or parts of the product assembled from the currently selected component variants.

Preferably, the application program 604 may accept user commands for manipulating the graphical representation of the displayed product or parts of the product. Preferably, the user commands are issued via a pointing device, such as a mouse, a touch pad, a track-ball, or the like. The manipulations may include rotation, zoom, removing or adding components from the display, selecting different variants of different components, animating the display so as to simulate functions of the product, such as opening or closing of the cap of the injection pen, adjusting the dose dialler, inserting a container in the pen fill holder, opening and closing the case, assembling or disassembling the pen, etc. The application program 604 may verify the compatibility of a selected variant of a component with previously selected variants of other components. The interaction step 601 continues until the user either exits the application program 604 or issues an order command in step 602, for example by selecting the "add to cart" button 711 shown in FIGS. 7a–g of the user interface with the pointing device. The add to cart button 711 may be disabled as long as not all the necessary components have been selected or if an incompatible selection has been made.

When the application program 604 receives the order command, the application program 604, in step 611, sends a URL including relevant parameters to the general purchase module 609. The parameters may comprise the identifications of the selected variants and the order identification generated in step 603. Preferably the application program 604 terminates with an end-of-process animation. After the step 616 of receiving the URL from the application program 604 the shopping cart module of the general purchase module 609 is initiated in step 612. This step 612 comprises a verification of the order identification.

If an order with the received order identification does not already exist, an order object is created in the purchase module 604. The received product parameters are stored within the order object. If the "custom product" item 807 is selected when a set of product parameters is already stored in the order object (step 613), a URL similar to the one generated in step 603 is generated in step 614, but now on the basis of the parameters and the order identification of the order object created in step 612. When sent to the graphics module 610, this will cause the application program 604 created in step 606 to be adapted to initially display the product as customised during the previous session. Hence, the user is given the opportunity to correct the product configuration after the product has been placed in the shopping cart.

FIGS. 7a–g show an embodiment of the graphical user interface presented to the user for the customisation of a product, exemplified by the medical injection pen described in connection with FIG. 2.

Figures 7A, 7B:
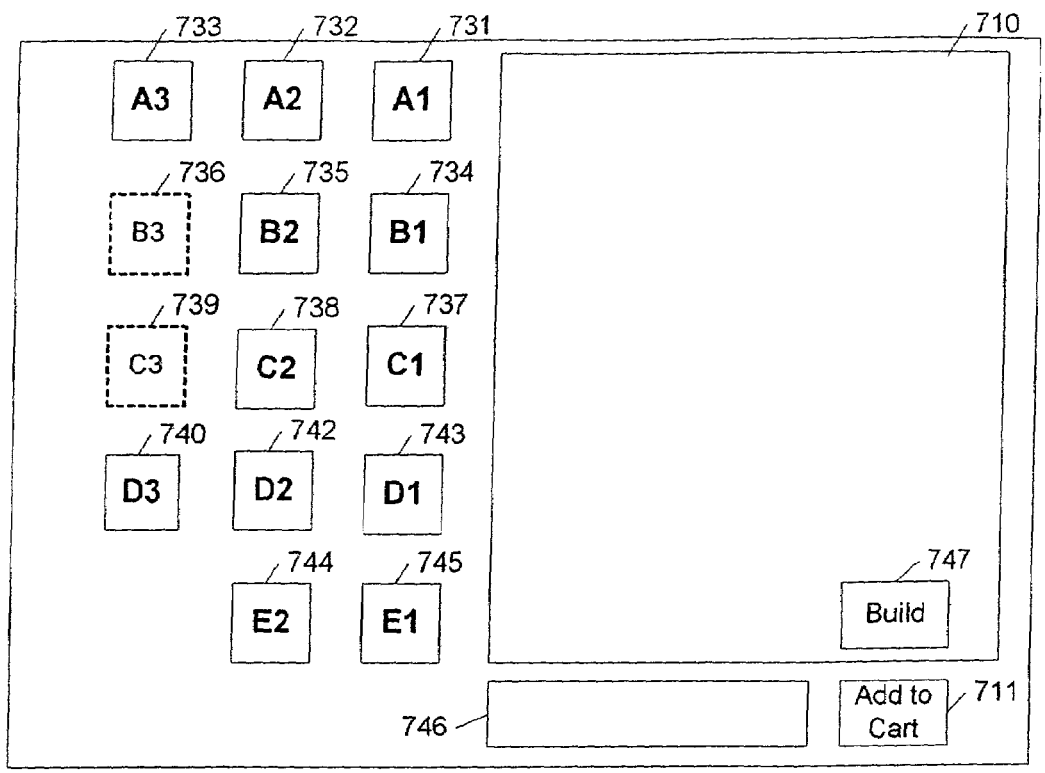

Upon selection of a "custom product" option, for example in the user interface of a general purchase module as shown in FIG. 8a, the application program controlling the graphical user interface initiates the display of an initial view in a predetermined display area 710. The default view may comprise a blank display with no components displayed as illustrated in FIG. 7a.

Other possible default views include a representation of a default configuration of the entire product or individual components, and a previously selected configuration, whose configuration parameters are accessible from a storage device, such as a hard disk or the computers RAM, or as input parameters to the application program supplied by another program. The representation may be a picture of the product, a drawing or, preferably, a three-dimensional rendering. Below the display area 710 a text field 746 is provided for displaying written product information, instructions for the use of the interface, or the like. The user interface further comprises buttons 731–745, each button representing a variant of a component of the product, said buttons being selectable by pointing or clicking with a pointing device.

Alternatively or additionally, other selectable control elements may be provided, such as pull-down menus, check boxes, representations of the component which may be placed on the display area 710 via a drag-and-drop opertion, or the like. Furthermore, the selection of variants may be controllable via keyboard commands. Preferably, the buttons 731–745 are labelled with an image or another identification of the corresponding variant as symbolised in FIG. 7a. The variants, which are selectable via the buttons 731–745, may be determined by the input received from the inventory database such that the buttons 731–745 only represent variants which are currently in stock.

Alternatively, all possible variants may be displayed, but only the buttons corresponding to variants which are currently in stock are enabled. In the example illustrated in FIG. 7a, the buttons 736 and 739 are disabled and, for example, greyed out, indicating that they cannot be selected because the corresponding variants are currently not available. The user interface further comprises a button 747 for starting an animation of a complete assembly process.

FIG. 7b shows the graphical user interface, after the user has clicked on the button 737, representing a first variant of the holster 708. In the display area 710, the first variant of the holster 708 is displayed, and the button 737 is highlighted to indicate the selected and displayed variant to the user.

Figure 7C:
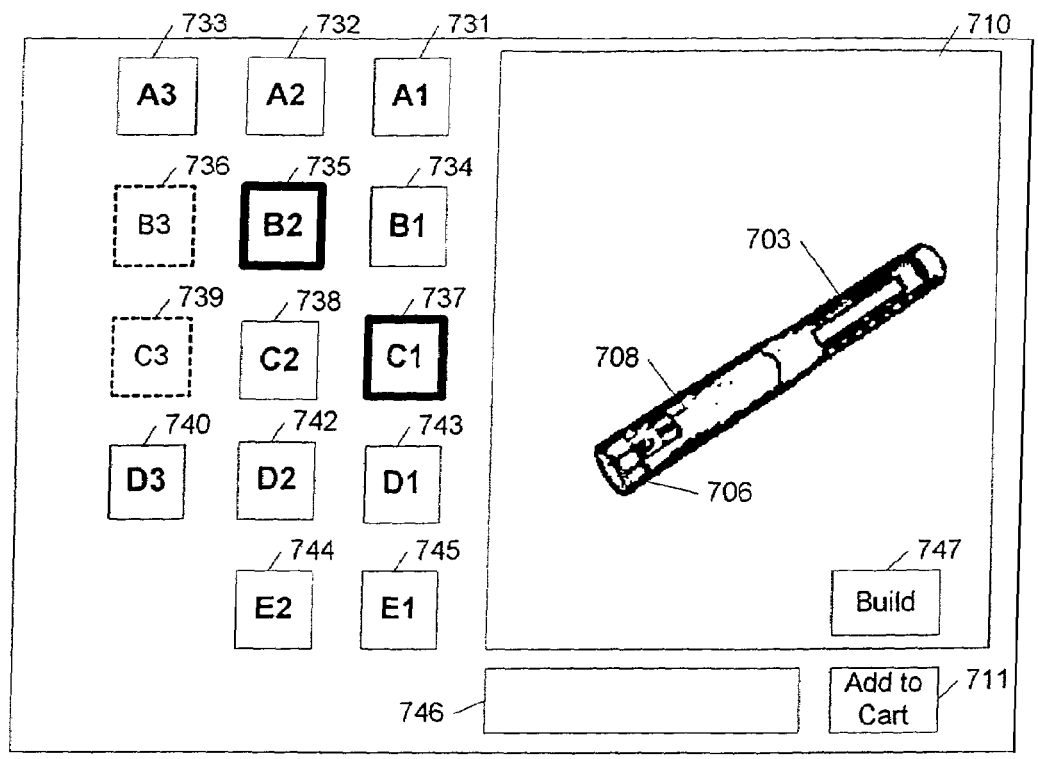

FIG. 7c shows the graphical user interface, after the user has clicked on button 735, representing the second variant of the pen fill holder 703, in addition to button 737. Now both variants are displayed in the display area 710 in their relative position in the assembled product. The user may manipulate the display via pointing, clicking or dragging with a pointing device to rotate the displayed components 703 and 708, zoom in or out, pan the display, or even initiate an animation of the operation of one or more of the components 703 and 708, such as placing a container in the pen fill holder 703 or adjusting the dose dialler 706. These animations may include sound effects or spoken instructions played over the loudspeakers of the user's computer.

Upon selection of the button 735, the second variant of the pen fill holder 708 may be placed directly within the display area 710 at the correct position relative to the holster 708. Alternatively, the positioning of the pen fill holder 703 may be animated, simulating for example a slight rotation of the pen fill holder when being attached to the holster 708. Alternatively, upon selection of the button 735, the second variant of the pen fill holder 703 may initially be placed in a default position within the display area 710. The user may be able to manipulate the individual components 703 and 708 separately via commands such as move, rotate, flip, zoom, or the like. By manipulating the components 703 and 708, the user may simulate the assembling of the product, and a visual or audible indication may be given, when the correct relative position of the two components 703 and 708 is found.

Figure 7D:
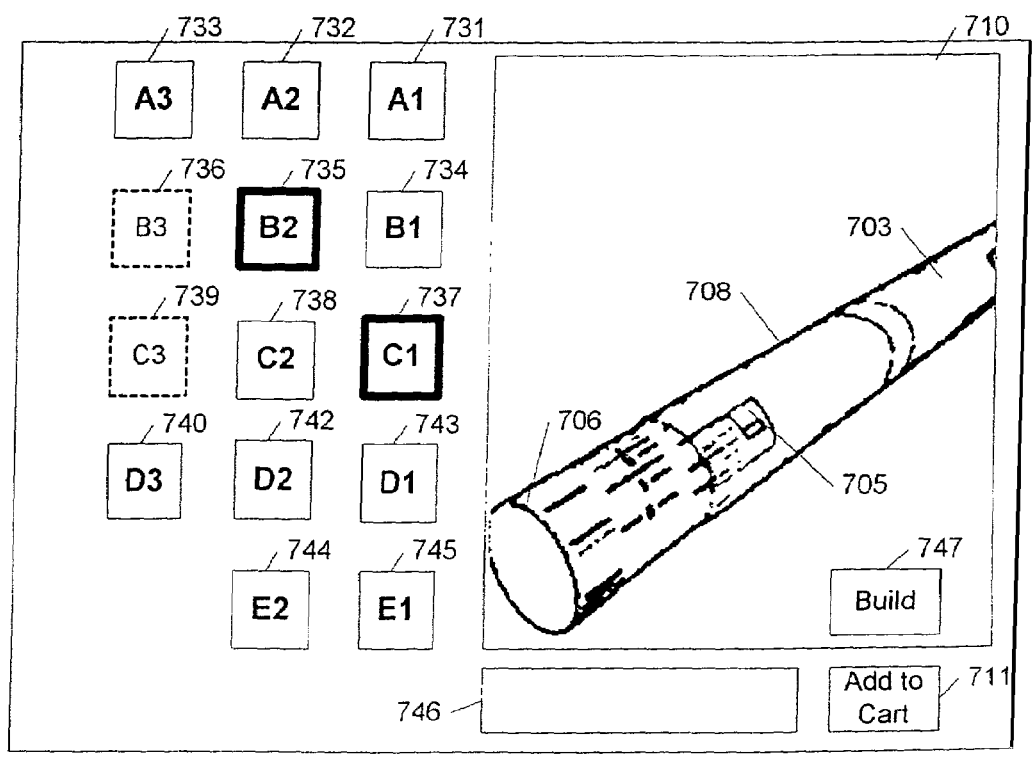

FIG. 7d shows the graphical user interface displaying the same components as in FIG. 7c, but after a zoom and a rotate operation. Now a close-up view of the dose dialler 706 is shown.

Figure 7E:
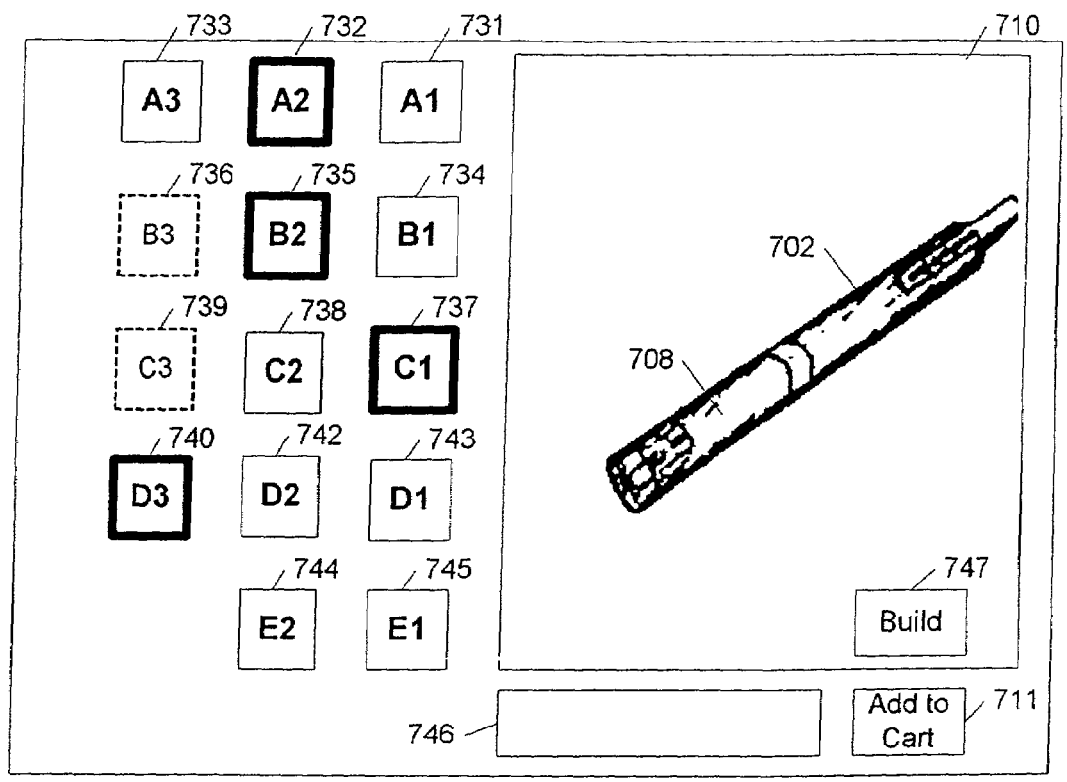

FIG. 7e shows the graphical user interface after variants of all components of the injection pen have been selected. Now the entire customised pen is displayed and may be manipulated. The user may also de-select one ore more components, or replace a variant of a component with another variant.

Figure 7F:
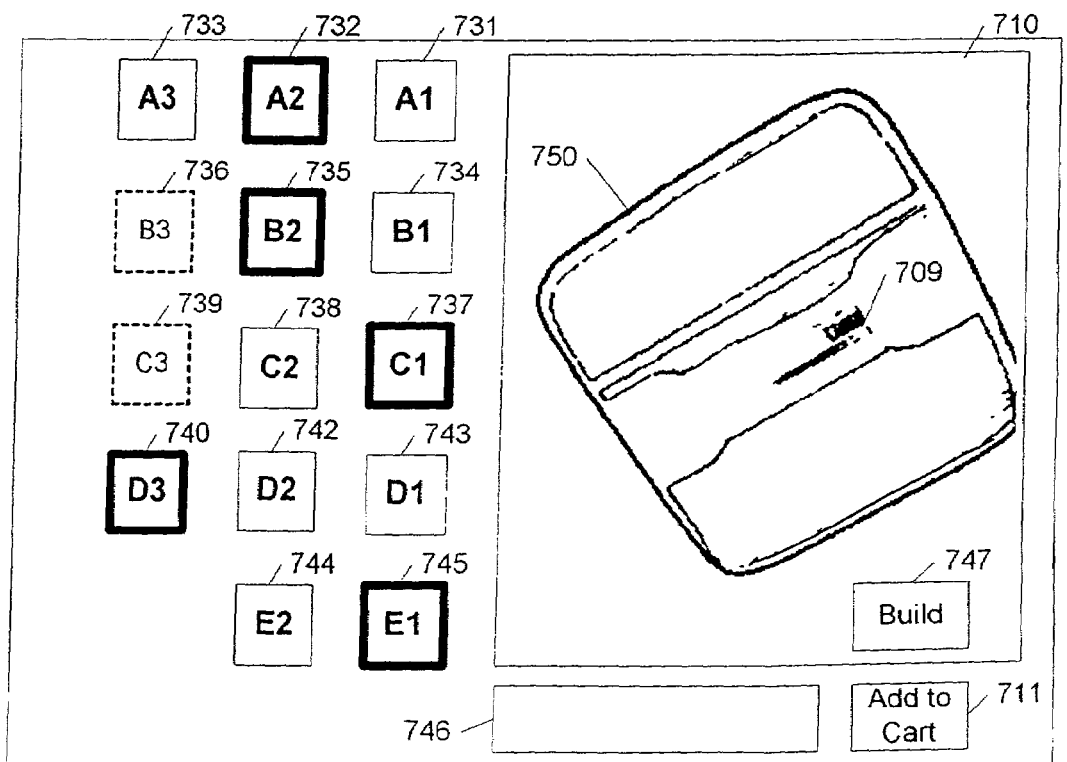
Figure 7G:
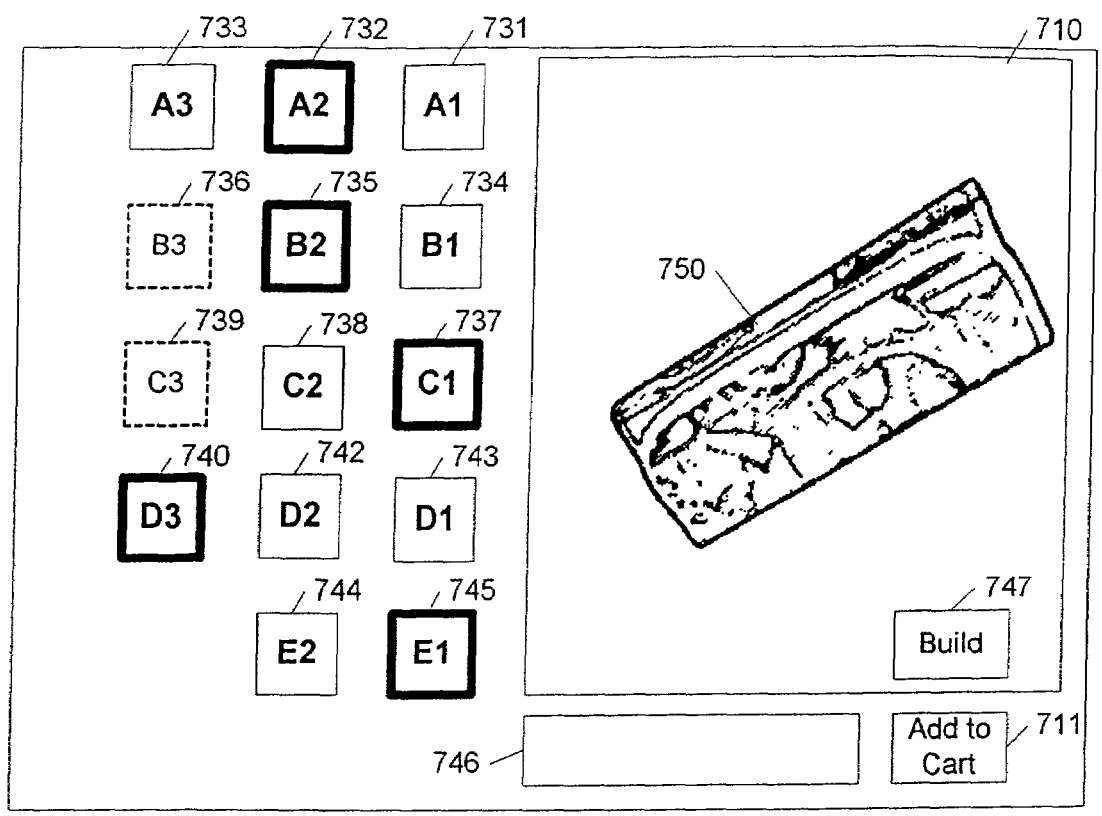

The user may also select one of two selectable cases, and FIGS. 7f and 7g show the graphical user interface after button 745, representing one possible case, has been clicked. In FIG. 7f, an open case 750 is shown. By clicking on the case 750 with the pointing device, an animation of the closing of the case may be initiated, resulting in a display as illustrated in FIG. 7g.

After completion of the customisation process, the user may click on the button 711 "Add to cart" for initiating the storing of the customisation parameters, such as product ID, component IDs and variant IDs of the selected variants, and for attaching the parameters to the shopping cart object, as described in connection with FIG. 6.

Now referring to FIG. 8a, an embodiment of the user interface of the general purchase module comprises a general browser menu bar 802 containing standard browser menus depending on the user's choice of browser. A top menu bar 803 of the general purchase module contains purchase-specific selectable control elements, such as hyperlinks or buttons. The control elements may include a "products" button 815, allowing accessing the available product hierarchy, which may comprise standard products and custom products as illustrated in FIG. 8b.

The control elements may further include a "shopping cart" button 816 allowing the viewing and manipulating of the contents of the user's shopping cart, a "distributors" button 817 allowing the choice of a distributor for a given order, a "shipping information" button 818 for inputting shipping information, such as name, address, phone number, and the like, and a "place order" button 819 for placing an order. The user interface also contains a bottom menu bar 804 comprising buttons or hyperlinks to general information, such as help 820, site information 821, or security information 822. The central part 812a–c of the user interface between the top menu bar 803 and the bottom menu bar 804 contains information and control elements, such as input fields, buttons, hyperlinks, or the like, which are related to the element selected in the top menu bar 803 or the bottom menu bar 804. In FIG. 8a, the contents of the user interface window after selection of the "products" element 815 is illustrated schematically. The centre part 812a–c is divided into three columns 812a–c, the left column 812a comprising selectable check boxes 805–807 for selecting one of a plurality of products from the product hierarchy.

Depending on the selection in the left column 812a, the centre column 812b may contain selectable options 808–809 for the selected product. If for example, as illustrated is FIG. 8a, a standard product "product 1" 805 is selected, the centre column 812b may contain a number of check boxes 808–809 for selecting options for that product. The right column 812c may comprise an area 810 containing a picture, a drawing or other product information of the selected product and further control elements, such as an "add to cart" button 811. If the product selected in the left column 812a is a "custom product" 807, the centre column 812b and the right column 812c may be used for displaying the user interface of the application program which is displayed in response to selecting a custom product. An embodiment of this user interface is described in connection with FIGS. 7a–g.

FIG. 8b illustrates an example of a product hierarchy corresponding to the user interface illustrated in FIG. 8a. The illustrated hierarchy comprises two standard products 853 and 854, for example a standard injection pen and a blood sugar measuring device. "Product 1" 853 is available with two options 856–857, for example two predefined colour combinations of the standard injection pen, while "product 2" 854 is available with three options 850, 851, and 859. The illustrated hierarchy further comprises a custom product 855, which may be assembled from a plurality of components available in different variants, as described in connection with FIGS. 7a–g.

The invention claimed is:

1. A method for assisting a customer in building a build-to-order medical device, the method comprising the steps of:
   a. establishing communication between a customer's computer device and a web server;
   b. providing a list of a plurality of variants for a first component for the medical device on the customer's computer device;
   c. receiving from the customer a choice of one of the plurality of variants for the first component;
   d. providing a second list of a plurality of variants for a second component for the medical device;
   e. receiving from the customer a choice of one of the plurality of variants for the second component;
   f. checking an inventory database to determine the availability of the customer's choices for the first and second components;
   g. checking a compatability data base to determine whether the customer's choices for the first and second components are compatable with each other;
   h. displaying on the customer's computer device a graphical representation of the build-to-order medical device as it will appear when assembled;
   i. graphically animating a method of assemblying the build-to-order medical device with sufficient clarity and detail so as to enable the customer without need for further instructions to assemble the build-to-order medical device from the customer's choice of components.

2. The method of claim 1, wherein the method further comprises the step of graphically animating the appropriate medical use for the build-to-order medical device.

3. The method of claim 2, further comprising displaying on the customer's computer a price for the build-to-order medical device.

4. The method of claim 3, further comprising receiving payment from the customer via the customer's computer device.

5. The method of claim 4, further comprising shipping the components necessary to assemble the build-to-order medical device to the customer.

6. A method for assisting a customer in building a build-to-order medical device, the method comprising the steps of:
   a. establishing communication between a customer's computer device and a web server;
   b. providing a list of a plurality of variants for a first component for the medical device on the customer's computer device;
   c. receiving from the customer a choice of one of the plurality of variants for the first component;
   d. providing a second list of a plurality of variants for a second component for the medical device;
   e. receiving from the customer a choice of one of the plurality of variants for the second component;
   f. checking an inventory data base to determine the availability of the customer's choices for the first and second components;
   g. checking a compatability data base to determine whether the customer's choices for the first and second components are compatable with each other;
   h. checking an inventory to determine if the customer's components are or are not available;
   i. executing a computer program, said computer program comprising instructions for receiving the determination that the customer's components are or are not available, and instructions for, if they are available and only if they are available:
      (i) displaying on the customer's computer device a graphical representation of the build-to-order medical device as it will appear when assembled, and
      (ii) graphically animating a method of assembling the build to order medical device with sufficient clarity and detail so as to enable the customer without need for further instructions to assemble the build-to-order medical device from the customer's choice of components.

7. The method of claim 6, wherein the method further comprises the step of graphically animating the appropriate medical use for the build-to-order medical device.

8. The method of claim 7, further comprising displaying on the customer's computer a price for the build-to-order medical device.

9. The method of claim 8, further comprising receiving payment from the customer via the customer's computer device.

10. The method of claim 9, further comprising shipping the components necessary to assemble the build-to-order medical device to the customer.

* * * * *